T. H. SIMPSON.
AUTOMOBILE LOCK.
APPLICATION FILED APR. 23, 1919.
1,348,453.
Patented Aug. 3, 1920.
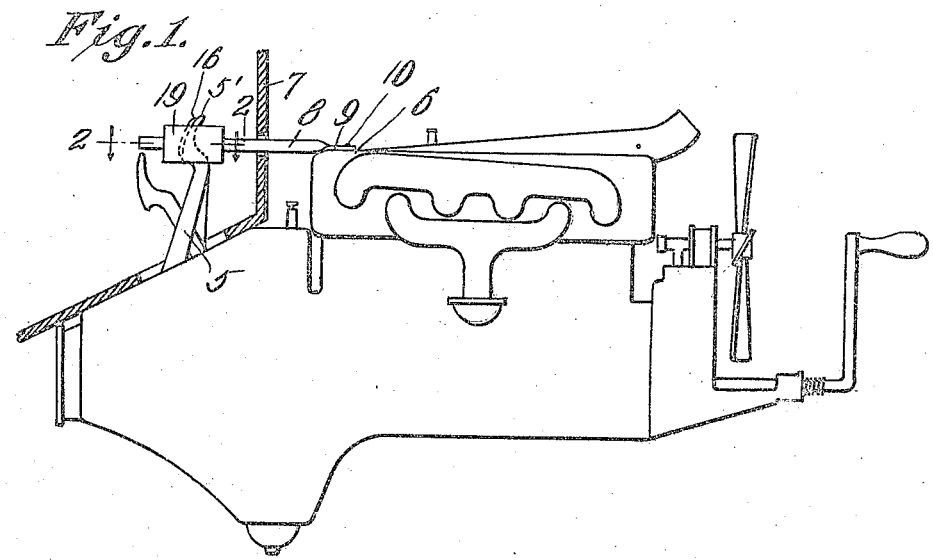
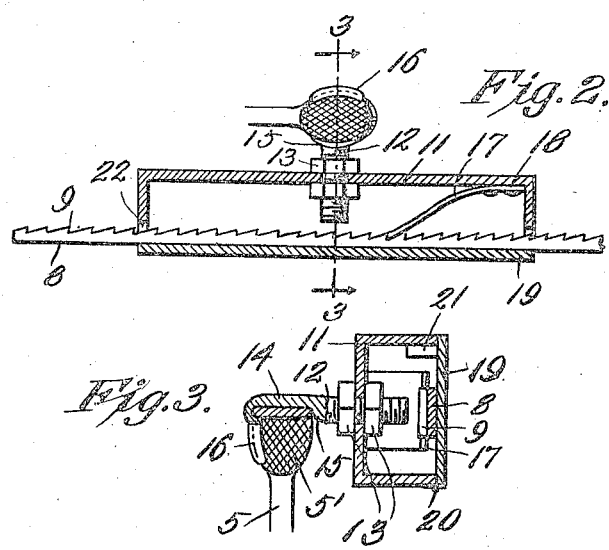
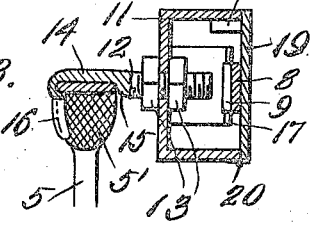
Witnesses
James F. Crown
H. B. Vrooman
Inventor
Thomas H. Simpson,
By Richard B. Owen.
Attorney

UNITED STATES PATENT OFFICE.

THOMAS H. SIMPSON, OF CENTERVILLE, IOWA.

AUTOMOBILE-LOCK.

1,348,453.　　　Specification of Letters Patent.　　Patented Aug. 3, 1920.

Application filed April 23, 1919. Serial No. 292,120.

*To all whom it may concern:*

Be it known that I, THOMAS H. SIMPSON, a citizen of the United States, residing at Centerville, in the county of Appanoose and State of Iowa, have invented certain new and useful Improvements in Automobile-Locks, of which the following is a specification.

This invention is an automobile pedal lock and has for its principal object the production of a structure which will efficiently and positively lock an operating pedal in a set position to prevent the operation of the motor of the automobile.

Another object of this invention is the production of an automobile pedal lock which includes a rack bar fixed in any desired manner to a portion of the automobile, while a locking casing is carried upon the pedal and coöperates with the rack bar, thus causing the casing to hold the pedal in position to prevent operation of the automobile.

Another object of this invention is the production of an automobile pedal lock wherein efficient means is provided for allowing the device to be placed upon the pedal and held against displacement when in use.

Another object of this invention is the production of an automobile pedal lock wherein the casing is provided with a movable plate which allows the bar to be released from a set engagement when it is desired to move the pedal, although when the plate is in a closed position, the casing will be held in a set engagement with the rack bar.

One practical form of construction and assembly of the present invention will be hereinafter described and is illustrated in the drawing, in which—

Figure 1 is a side elevation of the automobile pedal lock illustrating the same in use.

Fig. 2 is a horizontal section taken on the line 2—2 of Fig. 1, and

Fig. 3 is a vertical section taken on the line 3—3 of Fig. 2.

In the preferred embodiment of the present invention about to be described, it will be seen that in order to bring out the utility of the invention, it is disclosed as used in connection with the foot pedal 5 and the engine 6, of any suitable machine including the dash 7.

The rack bar 8 has teeth 9 upon one surface thereof, it being noted that this rack bar 8 is passed through the dash 7, as shown in Fig. 1. The forward end of the rack bar 8 is fastened to the engine as at 10. It is of course obvious that if so desired, this rack bar may be connected to any other desired portion of the machine, without departing from the spirit of the present invention.

The lock casing 11 is hollow, as indicated in Figs. 2 and 3. The supporting stem 12 is externally threaded and extends through the rear wall of the casing 11, being retained by the clamping nuts 13 which engage the inner and outer surfaces of the rear wall of the casing, as indicated in Figs. 2 and 3. This stem 12 is provided with a supporting plate 14 having an off-set shoulder 15 at one edge and with a clip 16 at its opposite edge. It will be noted that the treadle, 5' of the foot brake pedal 5, is engaged by the shoulder 15 and the clip 16, and also with the plate 14 to be fixed upon the treadle 5' for supporting the casing 11. As a result, it is obvious that as the pedal 5 is swung in either of two directions, it will move the casing simultaneously therewith.

In a great many makes of automobiles, it is known that when the foot brake pedal is moved in one direction, it moves and releases the foot brake and moves the clutch members into engagement with each other, whereas when it is moved in the opposite direction, the clutch members are disengaged when the brake is applied. Accordingly, when the brake is applied, even though the motor of the automobile is in operation, it is impossible to start the automoble, owing to the disengagement of the clutch members.

A flat spring 17 is fixed as indicated at 18 in the casing 11 and extends toward the opposite side of the casing. The front plate 19 of the casing 11 is hinged as indicated at 20 upon the casing and therefore may be swung to either an open or closed position as desired. A suitable lock 21 of any desired construction may be employed for releasably holding the front plate in a closed position.

When the device is in operation, the rack bar 8 is fastened as indicated upon the engine 6 or upon any other suitable supporting portion of the automobile. The plate 14 of the stem which supports the casing is also fixed upon the treadle 5' of the foot brake pedal, thus causing the casing to be moved simultaneously with the foot pedal 5. When the machine is in use and is operated by the owner or an authorized party, the front plate of the casing is swung to an open position, thus causing the rack bar 8 to be out of engagement with the spring 17. Accordingly, the brake pedal may be moved in either direction for engaging or disengaging the clutch members and applying or releasing the brake.

When, however, it is desired to lock the lever 5 in a set position, to prevent unauthorized operation of the automobile, the front plate 19 is swung to a closed position and is retained against unauthorized opening by the lock 21.

The casing 11 is provided with alined notches 22 in its ends through which the rack bar 8 extends at this time. It is therefore obvious that the treadle 5' may bring the foot brake pedal 5 forwardly to apply the brake and at this time, it is obvious the spring 7 may ride over the teeth 9 of the rack bar 8, owing to the manner in which the teeth extend. However, when the pedal 5 is in the position indicated in Fig. 1, it is released and at this time, the spring 17 will engage one of the teeth and will hold the pedal against counter-movement. Therefore, it will be impossible to start the automobile even though the engine be started. When it is desired to start the machine, however, the authorized party can release the plate 19 and thus will allow the casing to move in the opposite direction, since the rack bar will be released from its engagement with the front plate of the casing.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination with a support including an operating lever, of a bar carried by said support, a casing secured to said lever, lock means in the casing for engagement with said bar, a movable plate carried by the casing for releasably holding said bar in engagement with said lock means, and means for releasably locking said plate in a closed position.

2. In a device of the class described, the combination of a support including an operating lever, a rack bar carried by said support, a casing secured to said lever and movable therewith, a flat spring carried by said casing, a front plate movably mounted upon said casing, and the edges of the casing being recessed adjacent the front plate whereby said front plate may be closed for holding said rack bar in said recesses and in engagement with said spring, thus releasably holding said rack bar in a set position and means for releasably holding said plate in a closed position.

3. In a device of the class described, the combination of a support including an operating lever, a rack bar carried by said support, a casing, means for supporting said casing upon said lever, a flat spring carried by said casing, a front plate movably mounted upon said casing, whereby said front plate may be closed for holding said bar in engagement with said spring, thus releasably holding said rack bar in a set position.

4. In a device of the class described, the combination of a support having an operating lever, a bar carried by said support, a casing, a stem extending into said casing, means for holding said stem in engagement with said casing, said stem having a plate provided with an off-set shoulder to engage one edge of said lever and with a clip upon the remaining end thereof to embrace the opposite edge of the lever, whereby said plate may be held in a fixed engagement with said lever, and means carried by said casing for releasably engaging said bar for holding said lever in an adjusted position.

In testimony whereof I affix my signature in presence of two witnesses.

THOMAS H. SIMPSON.

Witnesses:
J. M. STRINGER,
C. F. POWELL.